Sept. 15, 1964  W. O. COMPTON  3,148,711
WIRE STRIPPING METHOD AND APPARATUS
Filed Oct. 6, 1960  7 Sheets-Sheet 1
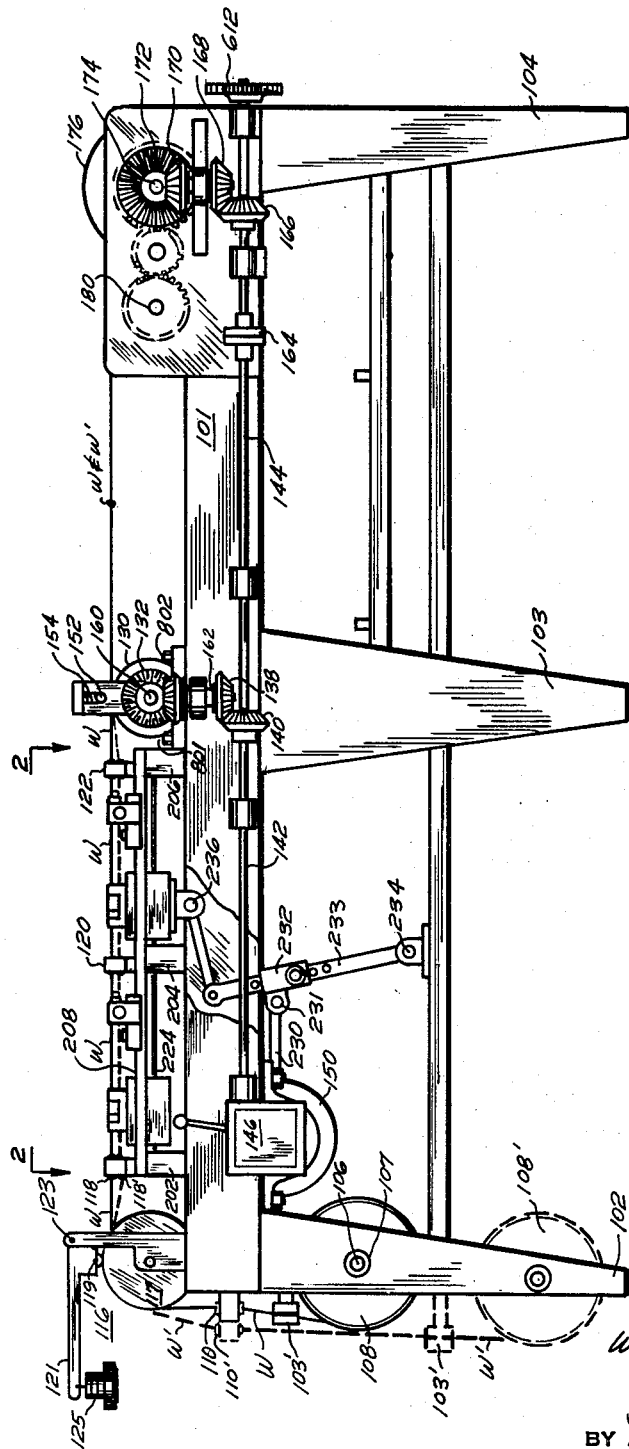
FIG. I.
WILLIAM O. COMPTON
INVENTOR
BY Richard G. Stephens
ATTORNEY

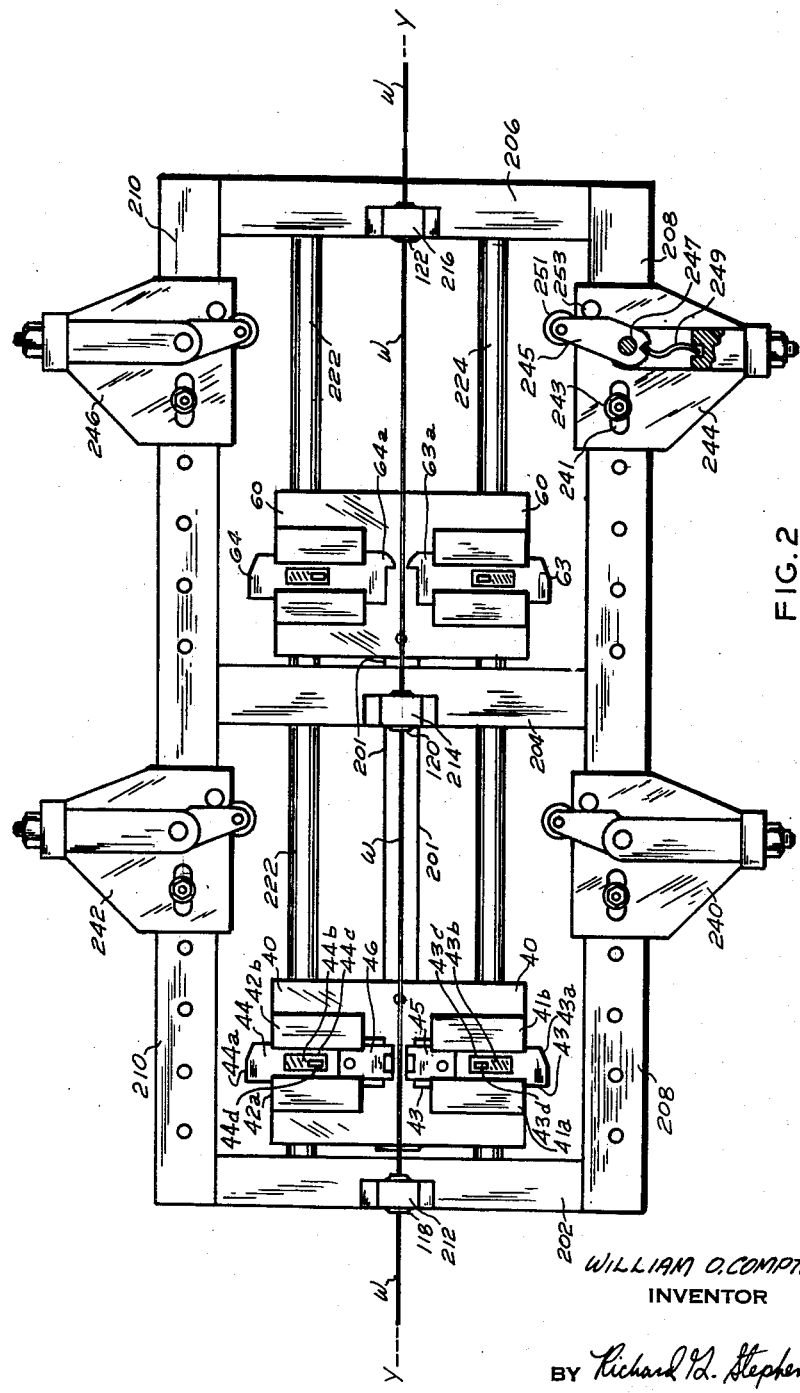

Sept. 15, 1964 W. O. COMPTON 3,148,711
WIRE STRIPPING METHOD AND APPARATUS
Filed Oct. 6, 1960 7 Sheets-Sheet 3
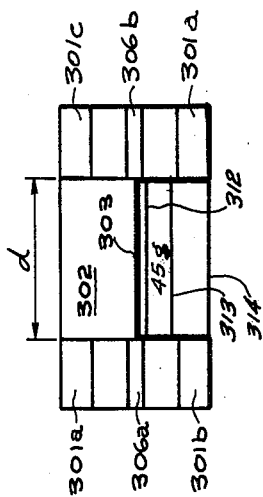
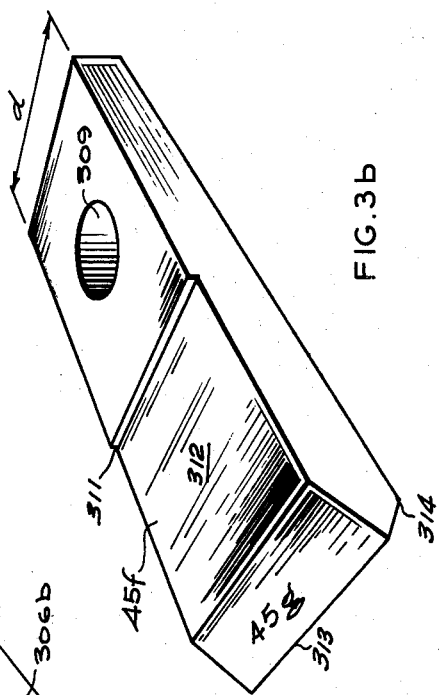
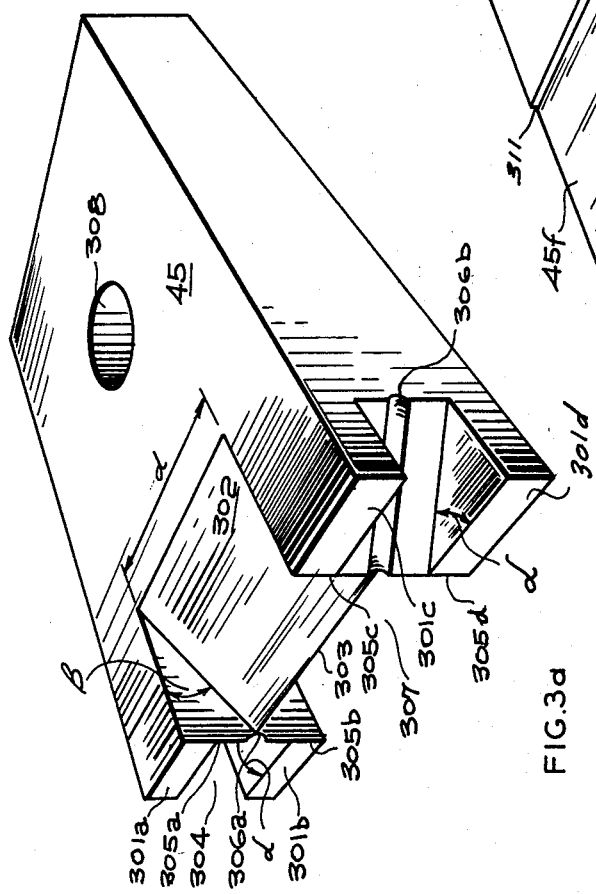
WILLIAM O. COMPTON
INVENTOR
BY Richard G. Stephens
ATTORNEY Sept. 15, 1964 W. O. COMPTON 3,148,711
WIRE STRIPPING METHOD AND APPARATUS
Filed Oct. 6, 1960 7 Sheets-Sheet 4

WILLIAM O. COMPTON
INVENTOR

BY Richard G. Stephens
ATTORNEY

WILLIAM O. COMPTON
INVENTOR

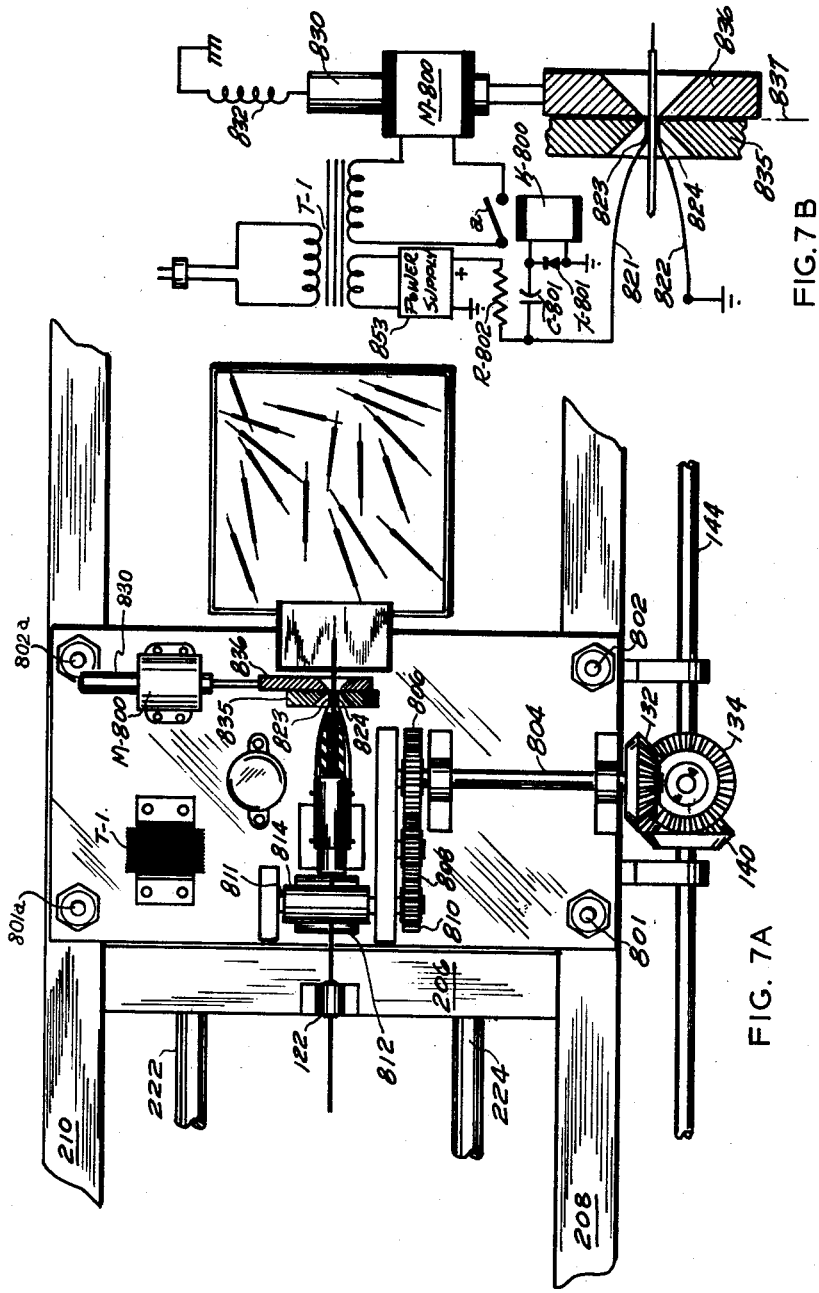

United States Patent Office 3,148,711
Patented Sept. 15, 1964

3,148,711
WIRE STRIPPING METHOD AND APPARATUS
William O. Compton, 778 River Road,
Chenango Bridge, N.Y.
Filed Oct. 6, 1960, Ser. No. 60,832
25 Claims. (Cl. 140—1)

This invention relates to method and automatic apparatus for preparing insulated wire for use in electrical and electronic equipment, and more particularly, to improved wire stripping and cutting method and apparatus.

The invention includes high production wire stripping apparatus in which an insulated wire conductor may be processed at great speed, so that the insulation sheath may be stripped therefrom at uniform spaced intervals, without cutting or damaging the wire conductor itself, whether the conductor is solid or stranded.

In one mode of operation of the invention the wire is re-coiled after having been stripped at uniform intervals, for later use. Wire which has been processed in such a manner, with stripped intervals of uniform length alternating with unstripped intervals of a second uniform length, is termed "center-stripped" wire, and wire prepared in such a fashion finds a ready market. Later by merely cutting each stripped portion of a "center-stripped" wire at its middle, two stripped ends are provided for connection as desired. An auxiliary cutter device capable of accurately and rapidly converting center-stripped wire to individual stripped leads is also shown in detail and described herein.

In an alternative mode of operation of the invention, a plurality of center-stripped wires are twisted together while being re-coiled, so that the stripped portions of the separate wires are longitudinally fixed with respect to each other in a definite relationship, or "synchronized." Later, such twisted pluralities of center-stripped wires may be connected with great facility of electrical equipment, such as telephone stepping switches, where banks of adjacent "lined-up" or staggered controls usually must be wired.

In one embodiment of the invention the one or more wires being center-stripped are fed immediately and directly to one or more wire cutting stages, which accurately cut center-stripped wire in the middle of each center-stripped portion to provide electrical lead wires. However, the cutter stage or stages of the invention alternatively may be mounted remote from the remainder of the apparatus of the invention, and used to cut center-stripped wire which has been recoiled after stripping.

In most wire stripping apparatus of which I am aware, the operations of insulation stripping and wire cutting have been intermingled, probably to the detriment of both. The wire and insulation have been severed at the same time, and then a severed sleeve of insulation has been slipped off a severed wire end. The process has involved starting, stopping and jerking of the wire, and the continued requirement for a freshly-severed end to be grasped by the machine after each wire cut. Apparatus capable of performing the required operations involved in providing stripped leads has been cumbersome, complex and relatively very slow-acting, a speed of 50 "strips" per minute being representative of the capabilities of such machinery. According to one feature of the present invention, on the other hand, continuous rather than intermittent wire motion is contemplated. The wire to be center-stripped is fed at a smooth, constant speed from a payout reel through my improved wire-processing machine, either to be re-coiled in center-stripped form or instead clipped into separate stripped leads, whichever may be desired. Such an arrangement allows a many-fold increase in speed, so that 350 to 400 strips per minute may be accomplished easily. Thus it is a primary object of the present invention to provide improved wire stripping method and apparatus which is capable of greatly increased speed.

In the usual wire stripping machine of the prior art, insulation has been removed essentially at one location or stage of the machine, which has complicated the mechanical arrangement of prior art machines. According to a further feature of the present invention, insulation is removed from the wire by separate, spaced-apart tools or stages, rather than by a single stage or tool; and, as will be shown below, the two-stage insulation removal feature of the present invention allows use of very simple and extremely rapidly-acting plural stages. Thus it is a further object of the invention to provide improved wire stripping method and apparatus which removes insulation in two successive stages, by separate, successive and spaced-apart tools, rather than by a single set of cutters.

In the invention a pair of blades located on opposite sides of the wire, in a carriage which reciprocates back and forth in the direction of wire travel, push toward each other and cut the insulation. Each blade or cutter is arranged to cut two spaced semi-circles which, together with identical cuts from the opposite blade, completely encircle the wire. The blades simultaneously, however, also cut two longitudinal slits between the semi-circular cuts, thereby cutting the insulation into two half-sleeves, but not removing the insulation from the wire. The arrangement allows use of simple, very rapidly-acting blades which operate with simple motions and at high speed without damaging the wire or failing to remove insulation. The cut half-sleeves of insulation then may be picked off the wire in a second stage after the wire has been translated longitudinally.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIG. 1 is an elevation view showing an exemplary embodiment of the invention;

FIG. 2 is a plan view of the insulation-cutting stage and the insulation-removing stage of the FIG. 1 embodiment of the invention; taken along line 2—2 in FIG. 1;

FIGS. 3a, 3b and 3c are views of a cutting tool and an associated positioning member constructed according to the invention, and a view of the cutting tool and positioning member assembled together;

FIG. 4b is a section taken perpendicularly to the view of FIG. 4a, along line X—X of FIG. 4a;

FIG. 7a is a plan view of a wire-severing stage which may be used in the invention to provide "double end stripped" uniform wire leads;

FIG. 7b is an electrical schematic diagram of the apparatus of FIG. 7a;

Figure 4A:
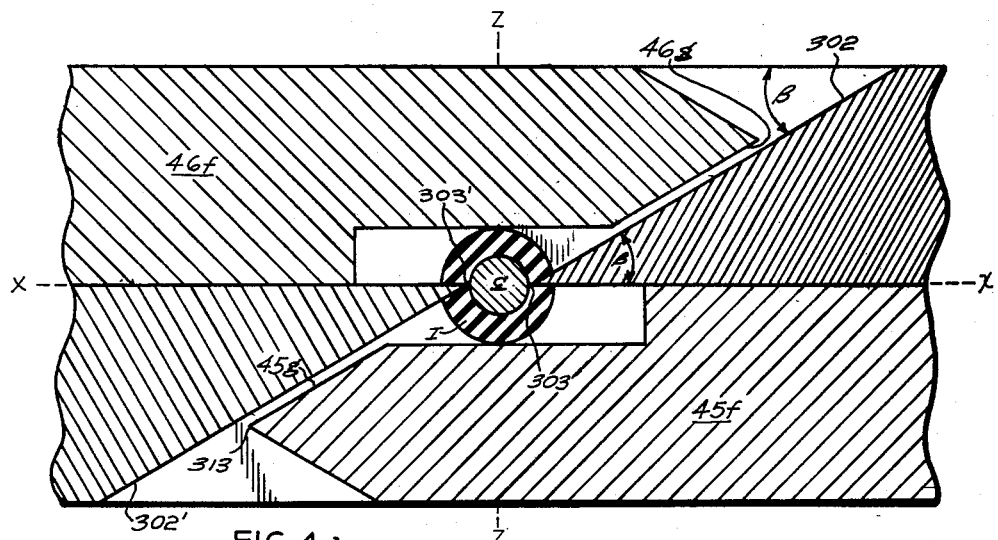
FIG. 4a is a section view taken through a pair of opposed cutters and the wire being stripped, showing the cutters at their condition of maximum advancement into the insulation sheath of the wire.

Referring now to FIGS. 1 and 2, it will be seen that the exemplary embodiment of the invention is shown mounted on table 101 having front legs 102, 103 and 104 shown in FIG. 1 and similar legs (not shown) on the rear side of the machine. Carried on axle 106, which is journalled in bearing 107 in leg 102 is wire payout reel 108, from which electrically insulated hook-up wire W, unstripped, is payed out, through fixed guide bushing 110, over entry end payout tension means 116 into horizontal guide bushing 118. Simple friction means 103', such as a cloth pad, may rub against wire W to provide a tension on the wire as it is pulled through the machine. Because my invention may utilize constant wire feed speeds without stopping, starting and jerking, the tension device used with the unreeling or payout portion of my invention may be considerably simpler than the devices needed with various other wire-handling machines without increasing the danger of wire breakage. Tension means 116, which may take a variety of different forms, serves to maintain substantially constant tension on wire W as the wire is pulled through the machine. Tension means 116 comprises an idler roller 117 having a groove (not shown) in which wire W lays, and roller 119, journalled in lever arm 121 urges wire W into the groove of roller 117, lever arm 121 being pivoted at 123 and urged downwardly by weight 125, which may be varied to provide a desired tension.

Wire W then passes from guide bushing 118 through guide bushings 120 and 122, all of which serve to maintain wire W substantially along axis Y—Y of the machine as the wire passes through the machine, regardless of the instantaneous lateral position of the wire on the reel as the wire is payed out from reel 108. The wire W is pulled through the machine by means of a pinch drive roll arrangement. Roll 130 comprises an abrasive-covered roll around which wire W is wrapped for one complete turn, and a keeper roll (not shown) carried on axle 152 is urged, by means of springs, such as 154 acting on axle 152, so as to maintain wire W pressed against abrasive-covered drive roll 130. Roll 130 is carried on shaft 160, which is driven at essentially a constant (after initial accelerations) desired speed by drive motor 150 through bevel gears 132 and 134, shaft 162, bevel gears 138, 140, shaft 142 and adjustable gear box 146. Drive shaft 142 also drives through bevel gears 138 and 163, a shaft 144, which is shown connected to drive, through slip clutch 164 and bevel gears 166, 168, 170 and 172, shaft 174 of take-up reel 176, upon which wire W is encoiled after having been "center-stripped." Geared to shaft 174 so as to operate in synchronism therewith is shaft 180, which is provided with a compound thread in usual manner to translate a traveling nut (not shown), which carries a conventional wire lay feed guide, thereby insuring that the center-stripped wire is laid on take-up reel 176 in smooth and even successive layers. Take-up reel 176 is geared to tend to rotate at a slightly higher surface linear speed than drive roll 130, so as to tend to maintain a tension on the wire between roll 130 and reel 176. Slip clutch 164 allows for the speed difference, and for changes due to change in the effective diameter of reel 176.

Paying particular attention now to FIG. 2 and those portions of FIG. 1 embraced by FIG. 2, it will be seen that table 101 carries three stationary lateral bed members 202, 204 and 206, which extend completely across the table. As well as supporting bushing pedestals 212, 214 and 216, which carry guide bushings 118, 120 and 122, respectively, lateral frame or bed members 202, 204 and 206 carry a set of longitudinal ways shown as comprising round bars 222 and 224, upon which cutting carriage 40 and pick-off carriage 60 are slidably mounted. Lateral members 202, 204 and 206 also carry a further pair of longitudinal ways or stringers, 208 along the front of the machine, and 210 along the rear. Slidably mounted on ways 222 and 224 longitudinally between entry end lateral bed member 202 and middle lateral bed member 204 is cutting carriage 40, which reciprocates in the space between the two mentioned lateral bed members, and similarly, pick-off carriage 60 is slidably mounted on ways 222 and 224 at a spaced longitudinal distance from cutting carriage 40, for reciprocation along the ways between cross members 204 and 206. Means shown as comprising connecting bar 201 rigidly connects cutting carriage 40 to pick-off carriage 60, so that the two carriages reciprocate in absolute synchronism and for exactly the same distances along ways 222 and 224. Crank means driven by motor 150 is connected to reciprocate or oscillate the carriages back and forth along ways 222 and 224 as wire is pulled through the machine by drive roll 130. A simplified form of crank mechanical connection to the carriages is shown in FIG. 1 to illustrate the principles of the invention more clearly, and a variety of substitute mechanisms are well-known to those skilled in the art. The drive connections in FIG. 1 are shown for ease of illustration as using rigid mechanical shafts and bevel gears, while commercial embodiments of the invention more likely would use chain belts and other well-known devices. In FIG. 1 a portion of the table frame is cut away to show crank arm 230, driven by an eccentric (not shown) on the opposite-end geared-down shaft of motor 150, with arm 230 pivotally connected at 231 to block 232, which is affixed to lever arm 233, the lower end of which is connected to fixed pivot 234. Reciprocation of crank arm 230 will be seen to reciprocate link 235, thereby reciprocating carriages 40 and 60, link 235 being pivotally connected to carriage 60 at 236. Block 232 may be adjustably fixed in position at various locations along lever arm 233, as indicated by the holes provided along lever 233, effectively modifying crank arm radius and thereby modifying the distance through which carriages 40 and 60 will be oscillated. With block 232 fixed at a selected location on lever 233, it will be seen that carriages 40 and 60 will oscillate or reciprocate through a certain distance during the number of motor shaft revolutions required for a complete cycle of reciprocation, and because drive roll 130 is also geared directly to motor 150, a certain length of wire W will be pulled through the machine during such a cycle. Because the wire-stripping means (carriages 40 and 60) are mechanically geared directly and synchronized with the wire translation means, drive roll 130, the center-stripping always is accomplished at accurately-measured intervals along the wire. Any change in the carriage reciprocation gearing or the drive roll gearing will alter the distance between strips, and, of course, such alteration frequently is intentionally provided.

Mounted on longitudinal ways 208 and 210 are four cam follower supports 240, 242, 244 and 246. Supports 240 and 242 are shown mounted near one end of the path of reciprocation of cutting carriage 40, and supports 244 and 246 are similarly located with respect to pick-off carriage 60. A plurality of holes are located along ways 208, 210 for coarse adjustment of the location of each cam follower support, and each cam follower support is provided with means, such as slot 241 and bolt 243 in support 244, for fine adjustment of the support to a desired fixed longitudinal location. Also, each support is provided with a pivoted, spring-held arm carrying a rotatable cam follower roller, as, for example, support 244, where arm 245, pivoted at 247 and spring-held by spring 249, carries roller 251. Spring 249 tends to maintain arm 245 spaced against stop pin 253. Each spring-held arm is free to pivot away from its associated stop as the carriages approach the follower rollers from the right, so that none of the tools will be actuated during the return half-cycle.

Each of carriages 40 and 60 comprises a tool-mounting block having a pair of opposed guide slots in which reciprocable tool-carrying cam blocks are carried. Cutting tool carriage 40 has a front guide slot formed by angular members 41a and 41b and a rear guide slot formed by angular members 42a and 42b, both guide slots being perpendicular to both the direction of wire travel and the direction of carriage reciprocation. Carried in the front guide slot between members 41a and 41b is tool-carrying cam block 43, which is provided with a cam surface 43a, a compression return spring 43b and a front recess in which cutting blade member 45 is mounted. Carried in the rear guide slot between members 42a and 42b is a similar tool-carrying cam block 44, which is provided with cam surface 44a, compression return spring 44b, and a front recess in which cutting blade member 46 is mounted. Slots 43c and 44c of cam blocks 43 and 44 surround compression return springs 43b, 44b and fixed boss portions 43d, 44d of carriage 40, so that the compression springs, in the absence of force on the cam surfaces, retain cam blocks 43 and 44 spread apart, retracted back from wire W. However, each time carriage 40 is reciprocated, cam surfaces 43a and 44a strike the cam follower rollers of supports 240 and 242, and because the cam surfaces slope outwardly as shown, the cam blocks are urged inwardly against the force of springs 43b and 44b. Thus the cutter assemblies 45 and 46 are cammed together from opposite sides of the wire, cutting two "half-sleeves" of insulation every time they are forced together, but not removing the half-sleeves of insulation from the wire conductor. Pick-off carriage 60 carries two pick-off tools 63, 64 which similarly are cammed toward the wire from opposite sides, to pick off the previously cut half-sleeves of insulation during the succeeding cycle of reciprocation, after they have been advanced longitudinally to the pick-off stage of the machine. Pick-off tools 63 and 64 each include a sharp leading edge and a retreating trailing edge. As will be explained in more detail below, edges 63a and 63b are cammed in to touch loose pieces of insulation at a time when wire W is traveling at a speed somewhat faster than pick-off carriage 60, so that there is a relative velocity between tools 63, 64 and wire W. The relative velocity helps the sharp edges to flick off the half-sleeve pieces of insulation that were cut by the cutting stage on the previous carriage reciprocation cycle.

Operation of the cutter assemblies may be better understood by reference to the various views of FIGS. 3 and 4. In FIG. 3a cutter 45 is shown as comprising a rectangular block member having a front face formed by four front surfaces (301a–301d) all lying in a common plane. A ramp portion 302 having a width $d$ commensurate with the desired stripped length is ground as shown, sloping at angle $\beta$ from one surface of member 45 to terminate in cutting edge 303. Oblique holes at 306a and 306b are drilled through member 45 as shown, and then oblique slots 304 and 305 are milled at the angle $\alpha$, providing semi-circular slots 306a and 306b. Each slot has a width at least slightly exceeding the outside diameter of the insulation on the wire to be stripped. The plane of surfaces 301a–301d is located forward from cutting edge 303 by an amount equal to one-half the diameter of the conductor from which insulation is to be stripped. Inner edges 305a and 305b of surfaces 301a and 301b are aligned to pass through the center, or diameter of semi-circular slot 306a, and edges 305c and 305d of surfaces 301c and 301d are aligned with a diameter through semi-circular slot 306b. Cutting edge 303 is located on a line tangent to slots 306a and 306b at edges 305a, 305b and edges 305c and 305d, respectively.

A rectangular slot 307 of width $d$ is milled in the base of member 45 to accommodate a positioning member 45f shown in FIG. 3b. Positioning member 45f is retained in slot 307 of member 45 by means of a screw (not shown) which passes through hole 308 of member 45, through bore 309 of member 45f, to thread into cam block 43. A step 311 is provided on positioning member 45f to space surface 312 some distance below cutting edge 303, which defines the top of slot 307, as best seen in FIG. 3c.

Figure 4B:
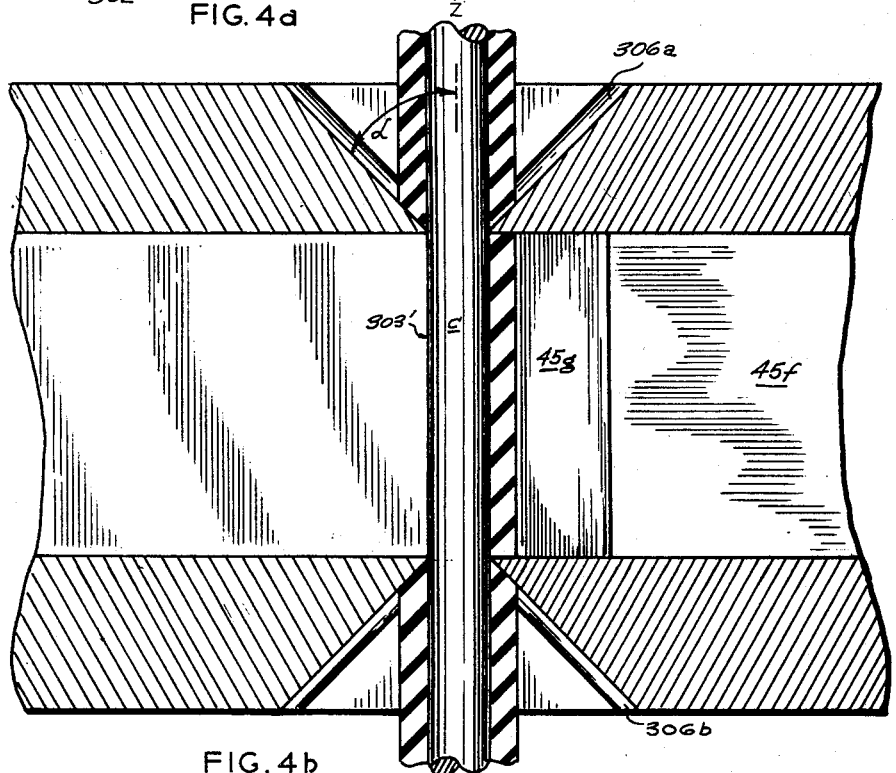

The functioning of the cutters and cooperating positioning members may better be understood by reference to FIGS. 4a and 4b. In FIG. 4a, cutter 45 and identical but inverted cooperating cutter 46 are shown at maximum extended position for cutting insulation, with the view taken in section through the center of the cutting assemblies. The faces 301a–301d of cutter member 45, and the counterpart faces of the oppositely-acting member 46 meet at a line indicated as Z—Z in FIG. 4a, and in fact, it is the engagement of faces 301a–301d with the cooperating faces of member 46 which positively limits the depth of insulation cut and insures that neither edge 303 of cutter 45 nor edge 303' of cutter 46 cut into metal conductor C. It will be seen that cutting edge 303 of assembly 45 and counterpart cutting edge 303' of the oppositely-acting cutter 46 have cut completely through the layers of insulation I and lie adjacent metal center conductor C, the two cutting edges 303 and 303' lying directly opposite each other along a diameter through the wire, having been translated horizontally toward each other along said diameter, shown as line X—X in FIG. 4a. Surface 45g of positioning member 45f and the counterpart surface on assembly 46 will be seen to position the wire in both horizontal and vertical directions, and to constrain the wire to be centered at the intersection of the X and Z axes in FIG. 4a, so that vibration and wire kinks or other irregularities tending to displace the wire do not prevent accurate insulation cuts from being made. It may be noted that slope 302 of cutter 45, counterpart slope 302' of cutter 46, surface 45g of positioning member 45f and surface 46g of counterpart positioning member 46f all are substantially parallel and all oblique to the cutting tool feed direction X—X. It is important that the cutter slopes from edge 303 to provide a wedge (of cross-section defined by the angle $\beta$), as a wedge shape aids tool 45 to lift insulation upwardly and aids tool 46 to push insulation downwardly, thereby aiding in loosening the insulation sheath.

FIG. 4b is a section view looking downward on the apparatus of FIG. 4a, with the section taken along the X—X axis of FIG. 4a, except that the complete metal conductor C is shown. Another characteristic of considerable importance in the operation of the cutters is the fact that each edge is ground to retreat at the angle $\alpha$ in FIG. 4b, to provide wedges rather than being straight.

In FIG. 1 a second wire W' is shown in dashed lines being payed out from reel 108' through friction means 103' and guide bushing 110', over a second groove in roll 117, into a guide bushing 118' located immediately below upper guide bushing 118. Wire W' may pass through the machine as shown in dashed lines, spaced evenly just below wire W, driven by drive roll 130 and then passed to the encoiling mechanism. It will be apparent that cam blocks 43 and 44 each may be made to hold two (or more) cutter assemblies stacked vertically one on top of the other, so that two (or more) vertically stacked wires may be cut each time cutting carriage 40 is actuated.

Figure 6:
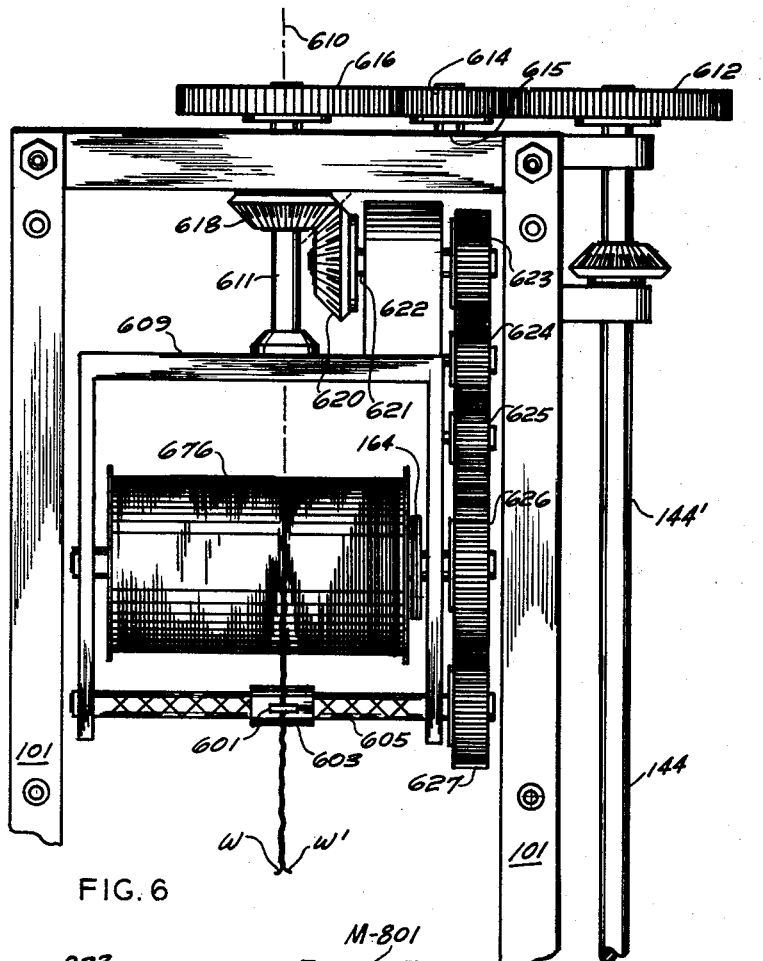
FIG. 6 is a plan view of an exemplary wire take-up means which may be used with stripping machines of the type described in order to twist plural strands of center-stripped wire as the strands are re-coiled.

A ready market exists for center-stripped wire in the form of twisted pairs, and by use of the alternative encoiling mechanism shown in FIG. 6, the invention is enabled to twist a pair of center-stripped wires as they are encoiled. Being cut at exactly the same time, both wires have their stripped portions maintained in a fixed longitudinal spatial relationship to each other. In FIG. 6 the alternative wire take-up or encoiling means is shown mounted on table 101 in place of the mechanism shown in FIG. 1. Wires W and W' are shown entering from drive roll 130 and passing through a single guide slot 601 of wire lay feed 603, a traveling nut which is reciprocated by means of a compound thread on shaft 605, in well-known manner. The wires then pass to encoiling reel 676, around which they are wound. Reel 676 and lay feed shaft 605 both are journalled for rotation in yoke 609, which itself is journalled for rotation about the axis 619 of shaft 611.

Shaft 144, which is driven by drive motor 150, as explained above in connection with FIG. 1, drives yoke 609 through slip clutch 164, spur gear 612 mounted on shaft 144', spur gear 614 mounted on stub shaft 615 in table 110, and spur gear 616. Bevel gear 618 is fixedly attached to the machine frame, concentric with and surrounding shaft 611. Mounted on the rear of yoke 609 are gear reducer 622 and bevel gear 620, the latter meshing with stationary bevel gear 618, so that input shaft 621 of speed changer 622 is rotated as yoke 609 rotates. The output shaft of speed changer 622 is connected, by means of spur gears 623–627 to rotate take-up reel 676 and wire lay shaft 605. The number of twists per given length of wire is selected by selection of the gearing between shaft 611 and shaft 144, the latter turning at a speed directly proportional to drive roll speed and hence wire linear speed. By substituting different pairs of gears for gear 612 and 614 the number of twists per given length may be adjusted. This having been selected, the gearing ratio between shaft 611 and take-up reel 676 then is adjusted so that reel 676 will tend to take up wire very slightly faster than drive roll 130 pays it out, thereby tending to maintain a tension on the twisted pair as it is wound on take-up reel 676. Slip clutch 164 allows for the intentionally provided difference in speed, and also allows for the take-up variation caused by the effective diameter change of reel 676 as wire is wound on it.

A better understanding of the method and apparatus of the instant invention may be had from consideration of specific parameters associated with one specific, operative embodiment of the invention, and from consideration of some principles associated with the invention.

It will be apparent from FIGS. 1 and 2 that the linear length of wire fed through the machine is directly proportional to the number of drive motor rotations, the gearing ratios between motor 150 and drive roll 130, and the diameter of roll 130. Similarly, it should be apparent that the number of reciprocations or cycles that carriages 40 and 60 make is directly proportional to the number of drive motor revolutions; since a fixed number of motor armature rotations are required in order to reciprocate the carriages through one cycle of their travel, regardless of the speeds involved. Since one "strip" is performed during each cycle of reciprocation of the carriages, it will be seen that the length of wire between strips, or the spacing of the strips, is independent of the speed of the drive motor. Thus the speed of the machine may be increased from standstill to a desired maximum and later stopped without the spacing between strips changing, which is a very important feature.

Figure 5:
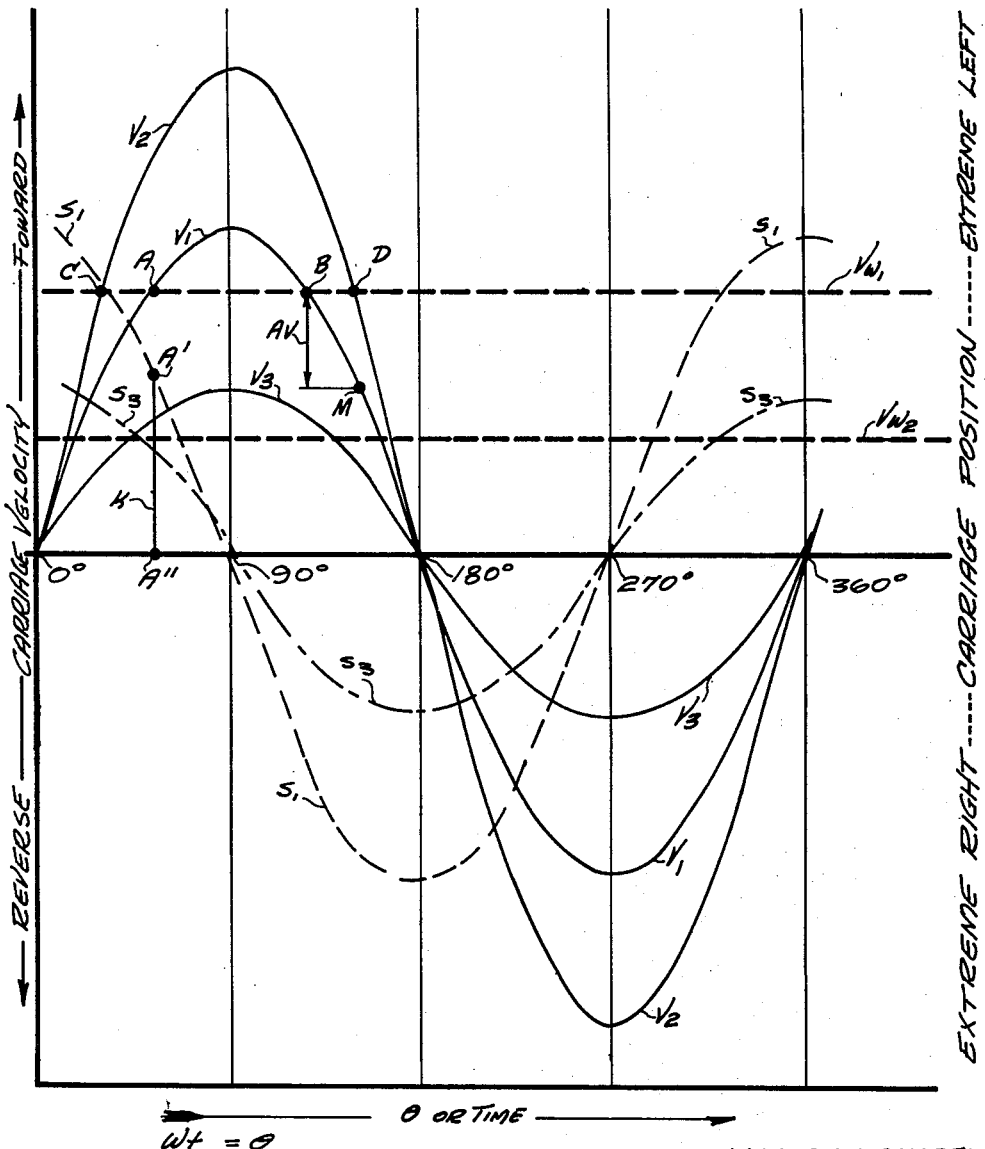
FIG. 5 is a graph of velocities, angles and displacements of various parts of a machine constructed in accordance with the invention, useful in understanding the theory and method of operation of the invention.

Since a simple type of crank mechanism is used, in the specific embodiment disclosed to reciprocate the cutting and pick-off carriages, the motion of the carriages with respect to the motor output rotations (or to time, in the case of a constant speed drive motor) may be described substantially by a sine curve. In FIG. 5 curve $V_1$ illustrates the velocity of the carriages plotted against $\theta$, the angular drive input to the crank mechanism, a complete reciprocation of the carriages forward and back requiring that $\theta$ pass through 360 degrees. At the 180 degree point it will be seen that the carriages are at their forward extreme of travel, and since curve $V_1$ goes through zero the carriages change direction at that point. Thus the zero to 180 degree portion of curve $V_1$ represents carriage velocity during the time in which the carriages are traveling in the same direction as the wire, while the 180 to 360 degree portion of the curve relates to the time during which the carriage is returning, in a direction opposite to wire travel.

If the crank mechanism is given a longer effective radius, it will be seen that the carriages will travel further during each cycle, and if drive motor speed remains the same, the carriages will travel necessarily at increased velocities to cover greater distances, but at the same frequency. Therefore, lengthening the crank arm would provide a velocity curve such as $V_2$, having an amplitude greater than that of $V_1$, but a period exactly the same as that of $V_1$. Conversely, shortening the crank arm radius would provide a velocity curve such as $V_3$, having an amplitude less than that of $V_1$ but a period exactly the same as that of $V_1$. It will be recognized that control of amplitude of oscillation, or the distance which the carriages travel, and hence control of their velocities, may sometimes be effected in equivalent manner by adjustments other than a simple radius change on a crank, especially in different forms of rotary-to-reciprocating motion-converting mechanism.

The displacement of the carriages is the time integral of their velocity, and in the example shown, displacement varies according to the sine integral, the cosine function. Hence the dashed displacement curve $S_1$ describes the displacement of the carriages from their zero positions under the $V_1$ conditions assumed. Their "zero positions" are the midpoints of their travel in a machine using a simple crank, and such midpoints, on a given machine, ordinarily are fixed permanently and may be marked on the bed of the machine. If drive motor 150 is rotating at some constant speeds, it will be seen that wire W will be pulled through the machine at constant speed, since drive motor 150 is connected through direct, although selectable, gearing to drive roll 130. Thus wire velocity $V_{W1}$ is a constant, represented by curve $V_{W1}$ in FIG. 5; or if gear changer 146 is varied, perhaps curve $V_{W2}$, for example.

An important principle of operation of my invention is that cutting carriage speed substantially matches wire speed at the time the cutters cut the insulation. This may be accomplished easily with a given crank arm setting and given required spacing between strips, by adjusting the location of fixed cam supports 240 and 242 along ways 208 and 210 (see FIG. 2), thereby adjusting the time of the "operating interval" of the cutting carriage and determining at what point or phase of the reciprocation cycle the cutting takes place. For example, referring now to FIG. 5, if the wire W is traveling at speed $V_{W1}$ and the crank arm is set at an intermediate radius to produce the carriage velocities of curve $V_1$, the cutting carriage fixed cam supports 240 and 242 should be located along ways 208 and 210 so that cutters 45 and 46 become closed at a time where curve $V_{W1}$ intersects curve $V_1$, such as point A or point B in FIG. 5. The cutting time of the cutters may be defined as the period beginning when the closing cutter surfaces first touch the insulation sheath, and ending when the cutters have backed off the insulation sheath. Cutting does not take place instantaneously in the invention, but usually rapidly enough so that carriage speed does not depart significantly from wire speed during the cutting interval. To set stops 240 and 242 properly to operate at point A, the displacement should be measured from curve $S_1$. Distance $A'A''$ in FIG. 5 indicates that if the cutting carriage actuating stops are set leftward "$k$" distance from the midpoint of the reciprocation cycle, that cutting will occur at point A of the cycle, which is one of the two times during the cycle when carriage speed matches wire speed. If, in the example given, the crank radius had been set instead to produce $V_2$ carriage velocities, the fixed stops 240 and 242 would have been adjusted along the ways to establish the cutting stroke at point C or at point D, where the $V_2$ curve intersects the wire speed curve. Dropping a line from a cosine curve (not shown) having an amplitude equal to the $V_2$ amplitude, at the value of rotation θ of point D, down to the base line would indicate the distance which the carriage-actuating stops should be positioned away from the midpoint in order to cut under point D conditions.

A further important principle of my invention is that pick-off carriage speed is arranged not to match but intentionally to differ from wire speed at the time the pick-off tools engage the cut half-sleeves of insulation they are expected to remove. Even though cutting carriage 40 is rigidly attached to pickoff carriage 60 by bar 201, so that the two carriages are reciprocated exactly in synchronism, the fixed cam supports 244 and 246 which actuate the pick-off tools are located so as to operate the pick-off carriage at a different part or phase of the reciprocation cycle from where the cutting carriage is actuated, at a time when a significant relative velocity exists between the wire and the pick-off tools. The relatively velocity between the wire and the pick-off tools helps pick the insulation half-sleeve pieces off the conductor. Assuming, for sake of example, that cutting was performed at point B in FIG. 5, a typical time to actuate the pick-off carriage might be at point M, where there is an appreciable difference $\Delta_V$ between carriage speed and wire speed.

In FIG. 2 pick-off tools 63 and 64 are shown with a sharp leading edge and a curved trailing edge. Pick-off tools shaped as in FIG. 2 contemplate with wire W will be traveling faster than carriage 60 at the time pick-off tools 63 and 64 engage the wire. It is quite within the scope of my invention, however, to reverse the shape of the tools in a longitudinal sense, and to operate the pick-off tools at a time when carriage speed exceeds wire speed.

To set up the machine for a given type of operation is quite simple. As mentioned above, the length between strips depends solely on the gear ratios between the crank mechanism and drive roll 130 (and the diameter of drive roll), and numerous ratios are made available in the device of FIGS. 1 and 2 by means of adjustable gear box 146. A further speed change mechanism may be incorporated, if desired, to limit both wire speed and carriage speed while still allowing higher motor speeds, but a speed change common proportionately to both drive roll 130 and the crank mechanism does not affect strip spacing.

Cutters of the desired strip length are inserted into cam blocks 43 and 44. Crank arm radius, or more precisely carriage reciprocation amplitude, is then adjusted, if necessary, so that carriage speed will at least equal wire speed at the 90 degree point of the carriage cycle, or preferably, carriage speed is made clearly to exceed wire speed at the 90 degree phase. Then, stops 240 and 242 are adjusted along ways 208 and 210 so as to actuate the cutters at a moment when carriage speed equals wire speed. Finally, stops 244 and 246 are adjusted to operate the pick-off tools when carriage 60 is traveling at a desired speed suitably different from wire speed, and then the machine is ready to operate. If desired the stops may be positioned along the ways and then the crank arm effective length adjusted, if desired.

When one desires to produce uniform end-stripped leads rather than center-stripped wire, apparatus such as that illustrated in plan view in FIG. 7a may be mounted on table 101, over bolts 801, 801a, 802 and 802a, in lieu of the drive roll apparatus shown in FIG. 1. If main drive roll 130 and bevel gear 132, upper roll 152, and the spring arrangement 154 all are removed from FIG. 1, the apparatus of FIG. 7a may be substituted in their place. Drive shaft 142 then drives bevel gear 134 via gears 140 and 138, but gear 134 now drives bevel gear 132, thereby rotating shaft 804 carrying spur gear 806, which drives lower drive roll 812 through gears 808, 810 and shaft 811. Drive roll 812 may be abrasive-wrapped or otherwise covered, if desired, to facilitate gripping the wire. Upper idler roller 814 is pressed downwardly by springs (not shown) in the same manner as shaft 152 in FIG. 1, so as to keep the wire pressed against drive roll 812. Drive roll 812 operates substantially identically to roll 130 in FIG. 1.

Mounted very near drive roll 812 and aligned with guide bushing 122 is inner hollow cylinder 820, formed of insulating material, such as Micarta or polyethylene. Outer hollow cylinder 819, also insulating, slidably fits over cylinder 820. Separately mounted from each other on longitudinally adjustable insulating cylinder 819 are contact arms 821 and 822, which comprise flexible metal bands formed of spring material, such as Phosphor bronze. Contact arms 821 and 822 are spring-biased so that in the absence of any wire between them their extreme right-hand ends almost, but not quite touch each other, but so that the space between them is less than the diameter of the metal conductor in the wire to be stripped. Then, as center-stripped wire exits from drive roll 812 and passes through cylinders 819 and 820, contacts 823 and 824 are maintained separated during all times in which unstripped wire is passing between them. However, upon arrival of a stripped portion between the contacts, the bared conductor completes the circuit between contacts 823 and 824.

As better seen in FIG. 7b the presence of bare wire between contacts 823, 824 of arms 821, 822 serves to ground terminal 856, thereby insuring that capacitor C–801 is fully discharged. Diode X–801 is poled so that C–801 discharges through the low forward impedance of the diode rather than through the coil of relay K–800. Thus relay K–800 remains de-energized and unoperated as long as bare wire maintains contacts 823 and 824 connected. As soon as the end of a stripped portion arrives, however, and insulation on wire W breaks the circuit, voltage from direct circuit power supply 853 is applied via resistor R–802 and capacitor C–801 to relay coil K–800. Current flows in relay coil K–800 until capacitor C–801 becomes substantially fully charged, and during the interval of current flow contact a of relay K–800 is closed, thereby applying actuating power to solenoid M–800. Upon energization solenoid M–800 draws its core inwardly, tending to center it, against the force of spring 832.

The translation of core 830 downwardly as shown in FIGS. 7a and 7b moves guillotine blade 836 downward rapidly, severing the copper center conductor in the middle of its stripped length, thereby providing a short lead stripped on both ends. The contacts 823 and 824 are shown in FIGS. 7a and 7b set to sense the presence of bare wire when it first appears very near the cutting line 837 where guillotine blade 836 bears against stationary cutting blade 835, but in actual practice it is more usual to slide cylinder 819 leftwardly as seen in FIG. 7a, so that the distance between contacts 823, 824 and cutting line 837 approximates quite closely one half the width of each stripped portion.

Figure 7C:
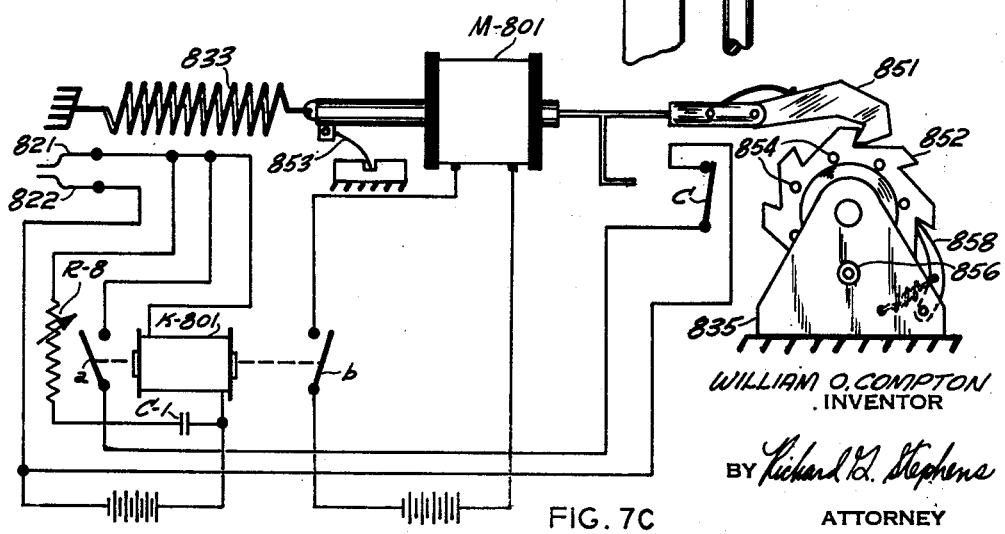
FIG. 7c is an electrical schematic diagram of an alternative wire-severing arrangement which may be used with the invention.

An alternative cutter arrangement is illustrated schematically in FIG. 7c. When a bared portion of wire closes the circuit between contact arms 821 and 822, relay K–801 is immediately energized, closing sealing contact a and power contact b, the latter applying power to operate solenoid M–801. Sealing or holding contact a, and the circuit through contact c serves to hold relay K–801 closed once it has operated.

Actuation of solenoid M–801 and consequent translation of its core rightwardly as viewed in FIG. 7c, serve to cock pawl 851 to engage the next tooth clockwise from the position shown. As the core 830 of solenoid M–801 is centered against the force of spring 833, solenoid limit contact c is opened, breaking the holding circuit of relay K–801. Connected in parallel with the coil of relay K–801 is capacitor C–1 and variable resistor R–8. Adjustment of resistance R–8 adjusts the time delay between opening of the holding circuit at c and transfer of power contact b of relay K–801, and therefore the time after cocking when solenoid M–801 is de-energized. Upon the opening of contact b spring 833 tends to return the core of the solenoid leftwardly in FIG. 7c. If desired, over-center means, shown as comprising a spring 853, may be provided to provide "snap-action" travel of the solenoid in both directions. Upon leftward translation of the core, pawl 851 rotates ratchet wheel 852 counterclockwise by one tooth. Spaced around wheel 852 at the same angular separation as successive teeth are a plurality of cutting holes, such as 854. Spring detent 858, which acts on the periphery of ratchet wheel 852, insures that one of the cutting holes always lines up with hole 856 in stationary cutting block 835, so that as soon as one lead is severed, the end within stationary cutting block 835 immediately may be fed through a hole in wheel 852.

Since variable resistance R–8 selectably varies the time after "sensing" of the presence of bared wire to the time of severing, it effectively controls the location within each stripped portion of each cut. Since wire speed through the machine also directly controls the amount of wire travel between bared wire sensing and severing, it may be appreciated that resistance R–8 may be mechanically ganged with the drive motor control rheostat (not shown) in some embodiments of the invention, so as to maintain desired stripped lengths on each lead cut regardless of machine speed, even during starting and stopping.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Wire stripping apparatus for removing a sheath from wire, comprising in combination: wire-feeding means for feeding wire past first and second stations at a substantially constant speed; a first station including sheath-cutting means synchronized with said wire-feeding means and operative to cut a length of said sheath into a pair of separate semi-cylindrical pieces; and a second station including pick-off means synchronized with said wire feeding means and said sheath-cutting means and operative to remove said cut separate pieces of said sheath from said wire.

2. Apparatus according to claim 1 in which said wire-feeding means includes tension means to maintain a desired tension on said wire, a drive motor, and a means driven by said drive motor for gripping and pulling said wire past said first and second stations.

3. Apparatus according to claim 1 having a bed with a stationary cam means mounted thereon, said pick-off means including tool-holding means reciprocable in a first direction past said cam means and pick-off tool means operated by said stationary cam means to pick off said separate pieces of insulation from said wire.

4. Apparatus according to claim 1 in which said wire feeding means is connected to feed plural wires past said first and second stations, and in which said apparatus includes encoiling reel means mounted to rotate about an axis substantially corresponding to the direction of travel of said wires, thereby to twist said plurality of wires about each other.

5. Apparatus according to claim 1 having a cutting station disposed to receive center-stripped wire from said second station, said cutting station comprising; sensing means disposed in the path of center-stripped wire and comprising spring-biased electrical contacts operative to sense the presence and absence of a stripped portion of wire; an electrical circuit including solenoid means operable by said electrical contacts; and wire-cutting means operated by said solenoid means to sever said wire.

6. Apparatus according to claim 1 in which said sheath-cutting means and said pick-off means are rigidly interconnected and reciprocable together parallel to the direction of travel of said wire.

7. Apparatus according to claim 1 in which said sheath-cutting means comprises a pair of mutually-opposed cutting tools adapted to be forced against said sheath-covered wire from opposite sides, each of said cutting tools having a front bearing surface area extending beyond all cutting portions, the bearing surface areas of said tools being adapted ultimately to strike each other as said cutting tools are forced toward each other from opposite sides of said wire, thereby limiting the minimum distances between cutting portions on the cutting tools and preventing the wire conductor from being severed.

8. Apparatus according to claim 1 in which said sheath-cutting means comprises a pair of mutually-opposed cutting tools adapted to be closed against said wire in a first direction from opposite sides of said wire, each of said tools including a pair of semi-circle cutting edges spaced apart at a distance equal to said desired length and a wedge-shaped edge extending between said semi-circle cutting edges in a second direction perpendicular to said first direction.

9. Wire stripping apparatus, for removing insulation at spaced intervals from wire fed into the apparatus, comprising in combination: wire feeding means including a payout reel and a drive reel for feeding said wire past first and second tool stages at a substantially constant continuous speed and motive means for driving said drive reel; first stationary cam means; a pair of opposed insulation-cutting tools between which said wire is arranged to pass, said tools being reciprocable in the direction of wire travel past said first cam means and operable by said first cam means to encircle said wire and cut into said insulation; second stationary cam means; and a pair of opposed insulation pick-off tools reciprocable past said second cam means and operable by said second cam means to pick off pieces of insulation cut by said insulation-cutting tools, said motive means being connected to reciprocate said cuttings tools past said first cam means and to reciprocate said pick-off tools past said second cam means.

10. Apparatus according to claim 9 in which said first cam means are located relative to the path of said insulation-cutting tools so as to cut into said insulation at a time during which the speed of said insulation-cutting tools in a direction parallel to wire travel is substantially equal to the speed of wire travel.

11. Apparatus according to claim 9 in which said second cam means are located relative to the path of said pick-off tool so as to pick off said pieces of insulation at a time during which the speed of said pick-off tools in a direction parallel to wire travel differs substantially from the speed of wire travel.

12. Apparatus according to claim 9 in which said motive means are connected through rotary-to-reciprocating motion converting mechanism to reciprocate said cutting tools and said pick-off tools relative to said first and second cam means in a direction parallel to the direction of wire travel.

13. Apparatus according to claim 9 in which said pick-off tools are located longitudinally along the direction of wire travel with respect to said cutting tools and in which said pick-off tools are spaced so as to pick-off pieces of insulation which were cut by said insulation-cutting tools during the immediately preceding cycle of reciprocation of said tools.

14. Wire stripping apparatus for removing lengths of sheath from wire, comprising, in combination:
wire-feeding means for feeding wire past first and second stations at a substantially constant speed in a first direction; a first station including sheath-cutting blades between which said wire is arranged to pass and means operable to periodically reciprocate said blades in a second direction perpendicular to said first direction, to close said blades to encircle said wire thereby to cut a length of said sheath into two semi-cylindrical pieces, and to retract from said wire; and a second station including pick-off means operative to remove said cut pieces of said sheath from said wire.

15. Apparatus according to claim 14 in which said wire-feeding means is arranged to feed said wire in a straight line past said first station, and in which said sheath-cutting blades are adapted to encircle said wire and cut said sheath without displacing said wire from said straight line.

16. Apparatus according to claim 14 in which said wire-feeding means comprises a drive roll located at the exit end of said apparatus and adapted to pull said wire past both said first and second stations in a continuous straight line.

17. Apparatus according to claim 14 in which wire-feeding means comprises a drive roll means adapted to pull said wire past said stations and a tension means located at the entry end of said apparatus, and wire guide means adapted to control the path of said wire but to allow the wire freely and continuously to adjust itself axially between said drive roll means and said tension means.

18. Wire stripping apparatus for removing a sheath from wire, comprising, in combination: wire-feeding means for feeding wire past first and second stations at a substantially constant speed; a first station including sheath-cutting means synchronized with said wire-feeding means and operative to cut a length of said sheath into a pair of separate semi-cylindrical pieces; and a second station including pick-off means synchronized with said wire-feeding means and said sheath-cutting means and operative to remove said cut separate pieces of said sheath from said wire; and stationary cam means, said sheath-cutting means including cam means and cutting blade means operated by said stationary cam means to cut said sheath.

19. Apparatus according to claim 18 in which said cutting blade means comprises a pair of mutually-opposed blades each having a pair of semi-circle cutting portions spaced apart a first distance, the semi-circle cutting portions of both blades being oppositely spaced from each other so as to cut a cylindrical portion of sheath having a length according to said first distance.

20. Apparatus according to claim 19 in which said blades also carry slitting portions for simultaneously cutting said cylindrical portions into two half-sleeves.

21. Wire stripping apparatus for removing a sheath from wire, comprising, in combination: wire-feeding means for feeding wire past first and second stations at a substantially constant speed; a first station including sheath-cutting means synchronized with said wire-feeding means and operative to cut a length of said sheath into a pair of separate semi-cylindrical pieces; and a second station including pick-off means synchronized with said wire feeding means and said sheath-cutting means and operative to remove said cut separate pieces of said sheath from said wire; and a cutting station disposed to receive center-stripped wire from said second station, said cutting station comprising sensing means disposed in the path of said center-stripped wire and comprising spring-biased electrical contacts operative to sense the presence and absence of a stripped portion of wire, an electrical circuit including electromagnetic drive means operable by said electrical contacts, and wire-cutting means operated by said electromagnetic drive means to sever said wire, said electrical contacts being connected to cause said electromagnetic drive means to operate immediately after sensing a stripped portion of said wire.

22. Apparatus for removing a sheath from a wire, comprising, in combination: means for translating said wire longitudinally at a uniform speed; cutter means; means for translating said cutter means at substantially the same speed parallel to said wire and for closing said cutter means around said wire to cut two semi-cylindrical portions from said sheath; a pair of picker members; and means for translating said picker members parallel to said wire at a speed different from said wire speed and for thrusting said picker members into engagement with said sheath to dislodge said semi-cylindrical portions from said wire.

23. Apparatus according to claim 22 in which said means for translating said cutter means is operative to reciprocate said cutter means and to close said cutter means around said wire when said cutter means attains substantially the speed of said wire.

24. Apparatus according to claim 22 in which said means for translating said picker members is operative to reciprocate said picker members and to thrust said picker members into engagement with said sheath when said picker members are travelling at a speed differing by a predetermined substantial amount from the speed of said wire.

25. Apparatus for removing an outer sheath from an inner filament, comprising, in combination: means for feeding said filament at a substantially constant speed in a first direction; cutter means; means for advancing said cutter means in a second direction perpendicular to said first direction to cut said sheath along a portion of said filament; pick-off means, and means for advancing said pick-off means in a direction perpendicular to said first direction to remove cut portions of said sheath from said filament, said means for advancing said pick-off means being spaced in said first direction from said means for advancing said cutter means.

References Cited in the file of this patent
UNITED STATES PATENTS

| | | |
|---|---|---|
| 786,454 | Montgomery et al. | Apr. 4, 1905 |
| 1,498,550 | Johnston | June 24, 1924 |
| 2,334,557 | Postlewaite | Nov. 16, 1943 |
| 2,464,860 | Green | Mar. 22, 1949 |
| 2,649,822 | Penn et al. | Aug. 25, 1953 |
| 2,722,145 | Schulenburg | Nov. 1, 1955 |
| 2,929,284 | Hagstrand | Mar. 22, 1960 |